(12) United States Patent
Sakai et al.

(10) Patent No.: US 7,497,462 B2
(45) Date of Patent: Mar. 3, 2009

(54) OCCUPANT PROTECTION SYSTEM

(75) Inventors: Katsuyuki Sakai, Hikone (JP); Keiichiro Nojiri, Hikone (JP)

(73) Assignee: Takata Corporation, Tokyo (JP)

( * ) Notice: Subject to any disclaimer, the term of this patent is extended or adjusted under 35 U.S.C. 154(b) by 739 days.

(21) Appl. No.: 10/651,038

(22) Filed: Aug. 29, 2003

(65) Prior Publication Data

US 2004/0100075 A1 May 27, 2004

(30) Foreign Application Priority Data

Nov. 21, 2002 (JP) .............................. 2002-338202

(51) Int. Cl.
*B60R 21/207* (2006.01)
(52) U.S. Cl. .................. 280/728.1; 280/730.1
(58) Field of Classification Search .............. 280/728.1, 280/730.1; 296/68.1; 297/216.1
See application file for complete search history.

(56) References Cited

U.S. PATENT DOCUMENTS

| | | | | |
|---|---|---|---|---|
| 5,082,326 A | * | 1/1992 | Sekido et al. | 297/284.6 |
| 5,340,185 A | * | 8/1994 | Vollmer | 296/68.1 |
| 5,695,242 A | * | 12/1997 | Brantman et al. | 297/216.1 |
| 6,296,292 B1 | * | 10/2001 | Feldman | 296/68.1 |
| 6,682,141 B2 | * | 1/2004 | Reynolds et al. | 297/216.1 |
| 6,752,454 B2 | * | 6/2004 | Ruel et al. | 297/216.1 |
| 2001/0011810 A1 | | 8/2001 | Saiguchi et al. | |

FOREIGN PATENT DOCUMENTS

| | | | |
|---|---|---|---|
| JP | 05229378 A | * | 9/1993 |
| JP | 10-217818 | | 8/1998 |
| JP | 2001-239872 | | 9/2001 |
| JP | 2001-247010 | | 9/2001 |
| JP | 2002-79861 | | 3/2002 |
| JP | 2002-79862 | | 3/2002 |
| JP | 2002-79863 | | 3/2002 |
| JP | 2002-264749 | | 9/2002 |
| JP | 2002-283901 | | 10/2002 |

* cited by examiner

*Primary Examiner*—Anne Marie Boehler
*Assistant Examiner*—Laura Freedman
(74) *Attorney, Agent, or Firm*—Foley & Lardner LLP

(57) ABSTRACT

An occupant protection system, which can easily be mounted to a seat, includes a seat pan placed between the front parts of the side frames of a seat, an airbag arranged above the seat pan, and a gas generator for inflating the airbag. The airbag extends along the width direction of the seat pan, opposite ends of the airbag being connected to the seat pan through anchors. The gas generator is arranged on the upper surface of the seat pan and is fixed to the seat pan with a bracket. The gas generator is connected to the airbag via a pipe.

5 Claims, 5 Drawing Sheets

OCCUPANT PROTECTION SYSTEM

BACKGROUND

The present invention relates to an occupant protection system for protecting an occupant of a vehicle, such as a car, in the event of a crash. More specifically, the present invention relates to an occupant protection system for restraining the lumbar part of the occupant during a front crash to prevent the body of the occupant from moving forward and downward.

Japanese Unexamined Patent Application Publication No. 2001-247010 discloses an occupant protection system for protecting an occupant in the event of a car crash. When a crash occurs, the system heightens or hardens the front section of a seat cushion in order to prevent a so-called submarine phenomenon, in which the occupant passes under the lap belt during a front crash.

FIG. 34 of Japanese Unexamined Patent Application Publication No. 2001-247010 shows an airbag that is placed between a left side frame and a right side frame of a seat and a gas generator that is disposed on the side of one of the side frames.

The occupant protection system disclosed in Japanese Unexamined Patent Application Publication No. 2001-247010 requires multiple operations to mount the system to a seat, including mounting both ends of the airbag to the left and right side frames, and mounting the gas generator to one of the side frames. Thus, the work to mount the occupant protection system to the seat is complicated.

SUMMARY OF THE INVENTION

It is an object of the present invention to provide an occupant protection system that can easily be mounted to a seat.

An occupant protection system according to an embodiment of the present invention includes a seat pan arranged below a seat cushion, an inflatable airbag arranged above the seat pan for pushing the front section of the seat cushion from below, and a gas generator for inflating the airbag in an emergency. Both the airbag and the gas generator are mounted to the seat pan. Accordingly, when mounting the occupant protection system to a seat, it is sufficient to mount the seat pan, to which the airbag and the gas generator are fixed in advance, below the seat cushion. Thus, the occupant protection system can be easily mounted to the seat.

The airbag can extend along the width direction of the seat pan, opposite ends of the airbag being connected to the seat pan. Extending the airbag along the width direction of the seat pan and connecting the opposite ends to the seat pan allows the airbag to be inflated uniformly between its ends and allows the front section of the seat cushion to be pushed uniformly from below along the width direction.

The gas generator can be arranged along the upper surface or the lower surface of the seat pan. Arranging the gas generator along the upper surface of the seat pan can facilitate the connection between the gas generator and the airbag. Arranging the gas generator along the lower surface of the seat pan can increase the flexibility of the arrangement of the gas generator.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Embodiments of the present invention will be described below with reference to the drawings.

Figure 1:
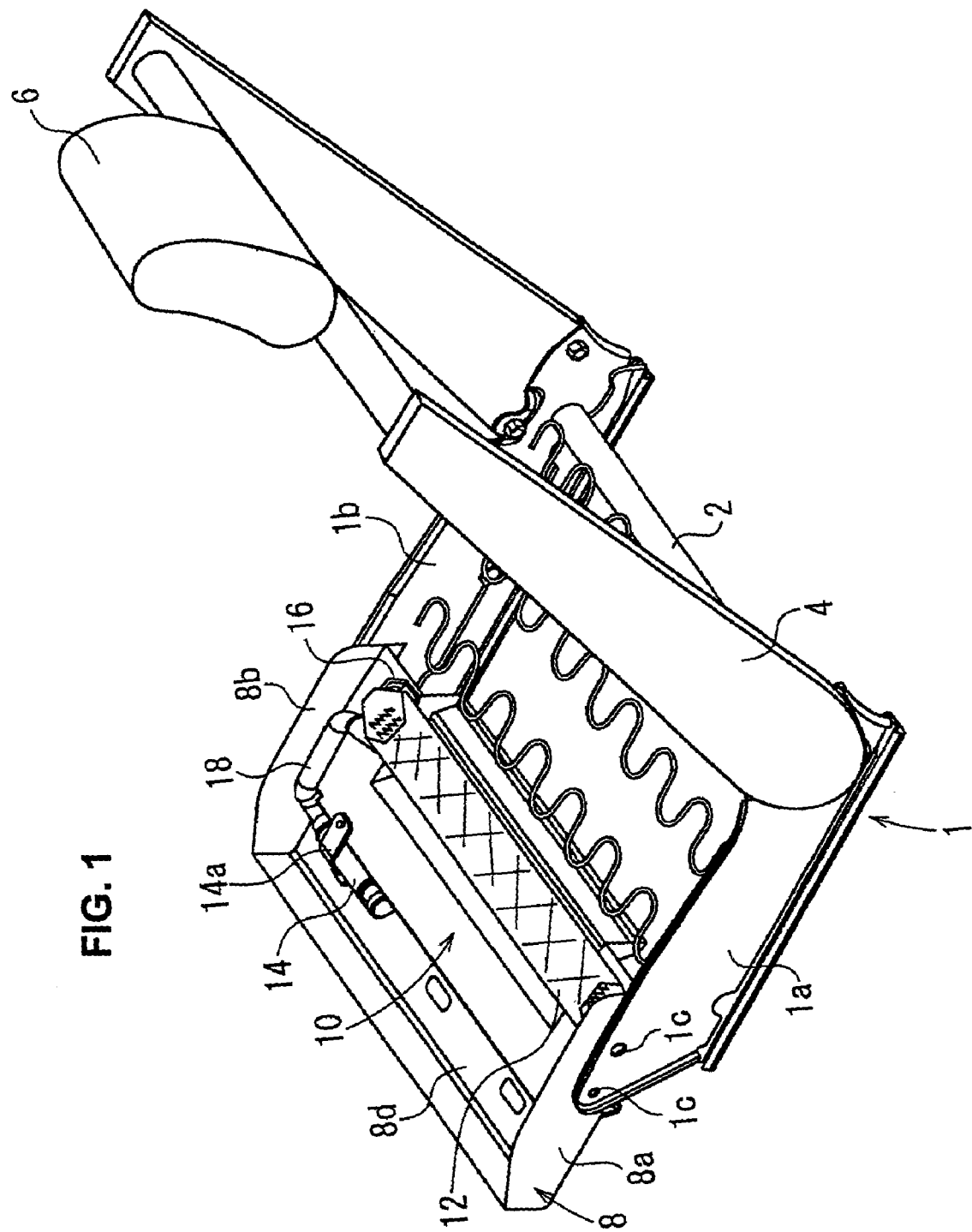
FIG. 1 is a perspective view of the frame of a seat provided with an occupant protection system according to an embodiment of the present invention.
Figure 2:
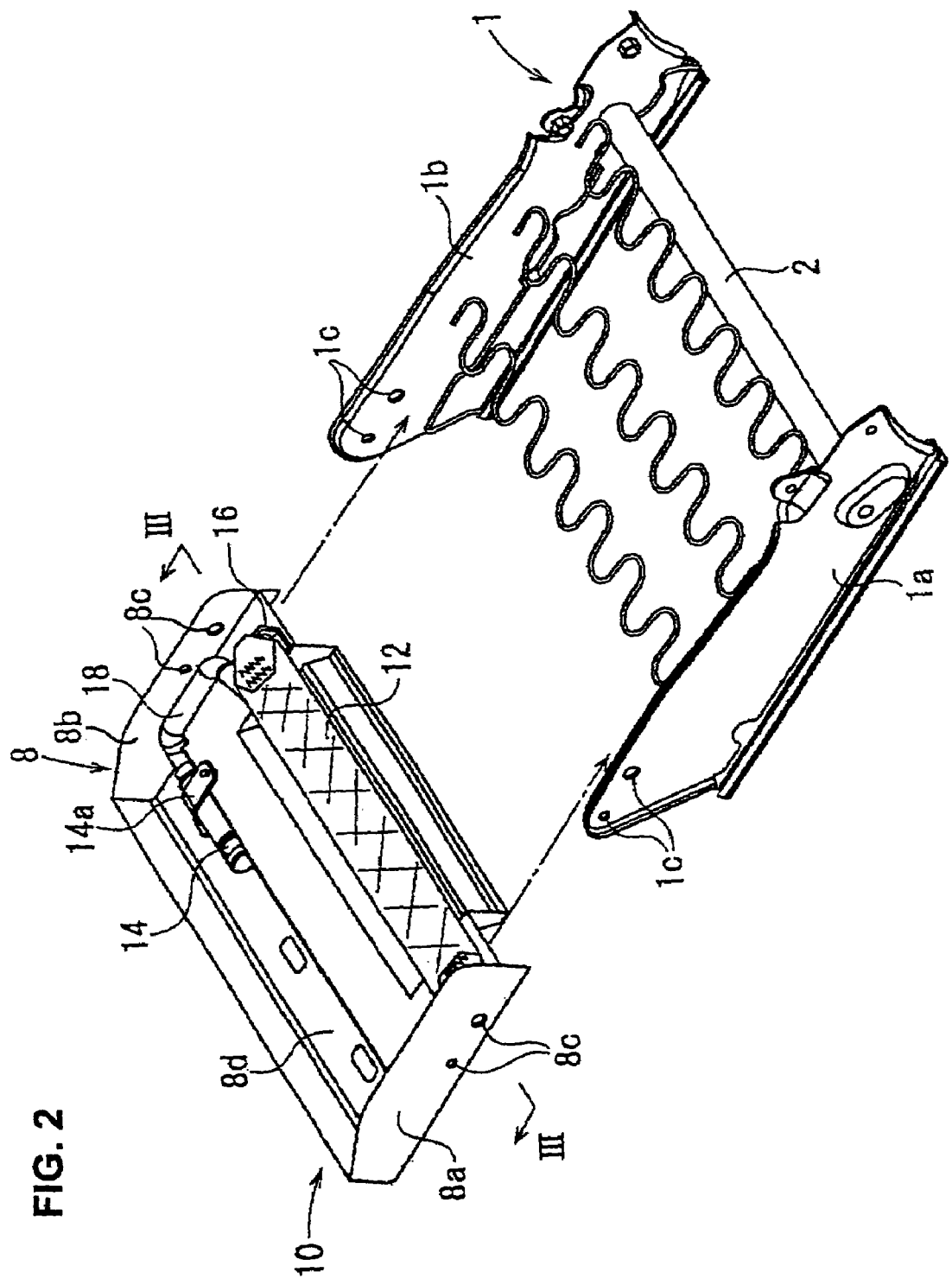
FIG. 2 is an exploded perspective view of the occupant protection system and the frame of FIG. 1.
Figure 3:
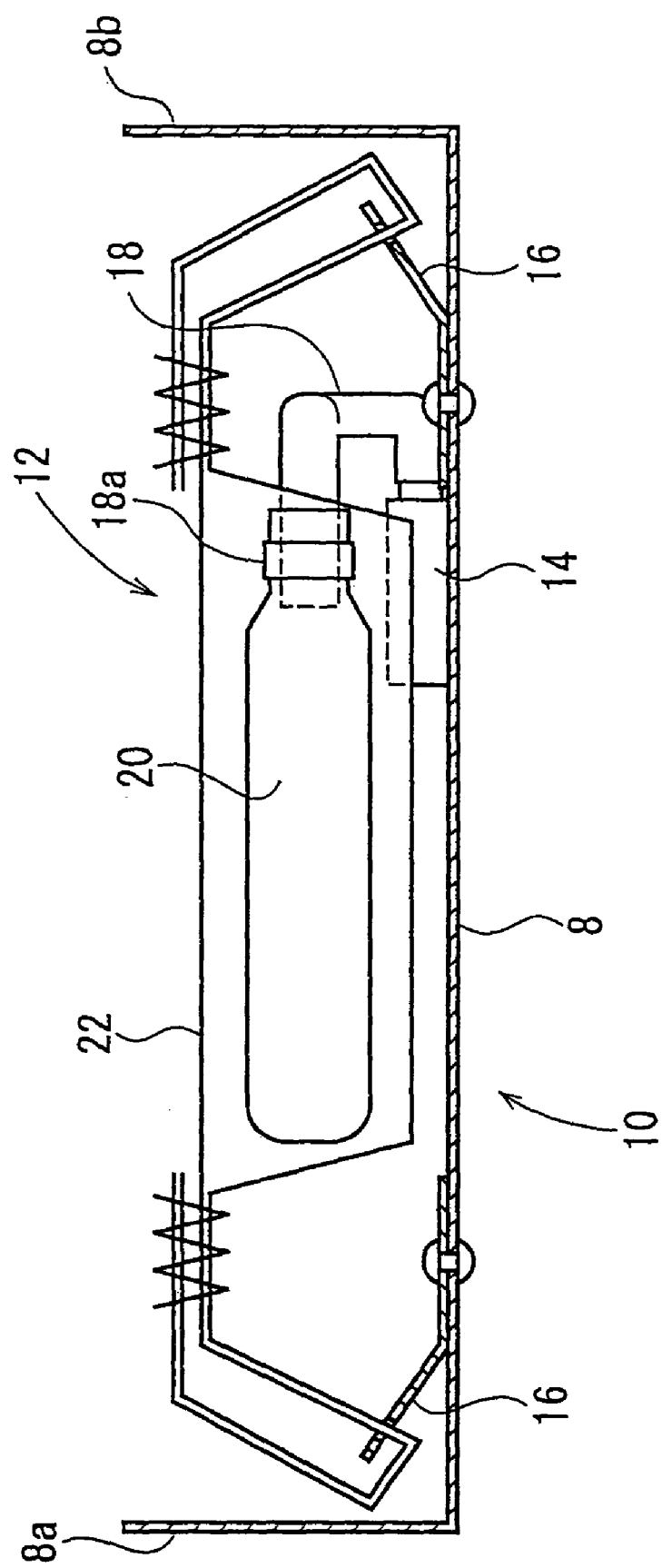
FIG. 3 is a sectional view of the occupant protection system in FIG. 2, taken along line III-III.

FIG. 1 is a perspective view of the frame of a seat provided with an occupant protection system according to an embodiment of the present invention; FIG. 2 is an exploded perspective view of the occupant protection system and the frame; and FIG. 3 is a sectional view of the occupant protection system in FIG. 2, taken along line III-III.

The frame of the car seat includes a base frame 1 and a back frame 4 rotatably connected to the base frame 1 through a support shaft 2 and a reclining device (not shown). A headrest 6 is mounted on the top of the back frame 4.

The base frame 1 includes left and right side frames 1a and 1b. A seat pan 8 is placed between the front parts of the side frames 1a and 1b. The seat pan has uprising side walls 8a and 8b that can be placed along the inner surfaces of the side frames 1a and 1b, respectively. Where the side frames 1a and 1b and the side walls 8a and 8b overlap, the side frames 1a and 1b and the side walls 8a and 8b have insertion holes 1c and 8c, respectively, for receiving fasteners, such as bolts and the like (not shown), therethrough.

The seat pan 8 is placed between the side frames 1a and 1b such that the side walls 8a and 8b overlap with the inner surfaces of the side frames 1a and 1b. The overlapping side walls 8a and 8b and the side frames 1a and 1b are fastened with fasteners, such as bolts and nuts, through the insertion holes 1c and 8c, so that the seat pan 8 is fixed between the side frames 1a and 1b.

A seat cushion and a seat back made of urethane or other suitable materials are mounted to the base frame 1 and the back frame 4, respectively. The seat pan 8 is placed under the front section of the seat cushion.

An occupant protection system 10 includes the seat pan 8, an inflatable airbag 12 arranged above the seat pan 8 for pushing the front section of the seat cushion from below, and a gas generator 14 for inflating the airbag 12. The airbag 12 extends along the width direction of the seat pan 8. Laterally opposite ends of the airbag 12 are connected to the seat pan 8 through anchors 16 fixed to the upper surface of the seat pan 8. The gas generator 14 of this embodiment is cylindrical. In addition, the gas generator 14 is arranged along the upper surface of the seat pan 8, and its longitudinal axis extends along the width direction of the seat pan 8. According to this embodiment, the front of the upper surface of the seat pan 8 has a recessed step 8d that is recessed a sufficient distance to accommodate the gas generator 14; that is, the recessed step 8d has a height that is about the height of the gas generator 14 from its upper surface to its lower surface. The gas generator 14 is placed in the recessed step 8d. Reference numeral 14a of FIG. 1 denotes a bracket for fixing the gas generator 14 in the recessed step 8d.

The gas generator 14 is connected to the airbag 12 through a pipe 18. The pipe 18 is arranged along the upper surface of the seat pan 8.

Referring to FIG. 3, the airbag 12 includes a cylindrical bag body 20 and a cylindrical mesh webbing 22 surrounding the bag body 20. The bag body 20 is an elongated folding body. The mesh webbing 22 is formed of knitting that freely extends radially but hardly extends longitudinally, along the width direction of the seat. Both ends of the mesh webbing 22 are connected to the anchors 16.

A first end of the pipe 18 is connected to a gas port of the gas generator 14. A second end of the pipe 18 is inserted into the mesh webbing 22 at the first end of the mesh webbing 22, and it is connected to an end of the airbag body 20. Reference numeral 18a indicates a fastener for fastening the end of the bag body 20 to the pipe 18.

Prior to mounting the occupant protection system 10 to the seat, the airbag 12 and the gas generator 14 are mounted on the upper surface of the seat pan 8, and the gas generator 14 is connected to the airbag 12 via the pipe 18 to form the occupant protection system 10. The seat pan 8 then is disposed between the front parts of the side frames 1a and 1b of the seat, which is assembled in another process, and is secured to the side frames 1a and 1b.

As described above, in the present occupant protection system 10, the airbag 12 and the gas generator 14 are fixed to the seat pan 8 prior to mounting the seat pan 8 to the seat. Accordingly, when mounting the occupant protection system 10 to the seat, the seat pan 8, to which the airbag 12 and the gas generator 14 are fixed in advance, can be mounted between the side frames 1a and 1b expediently. Thus, the occupant protection system 10 can be easily mounted to the seat.

Since the gas generator 14 is arranged along the upper surface of the seat pan 8, the mounting of the gas generator 14 to the seat pan 8, and the arrangement of the pipe 18 for connecting the gas generator 14 to the airbag 12, are easy.

Operation of the occupant protection system 10 will now be described.

When a front impact of a vehicle is sensed, the gas generator 14 jets a gas. The gas from the gas generator 14 flows into the airbag 12 through the pipe 18 to inflate the airbag 12. As a result, the front section of the seat cushion is pushed up or hardened, thus preventing forward movement of the lumbar part of the occupant.

According to this embodiment of the occupant protection system, the airbag 12 extends along the width direction of the seat pan 8, and both ends of the airbag 12 are connected to the seat pan 8 via anchors 16. Accordingly, the airbag 12 is uniformly inflated between both its ends, and, hence, the front section of the seat cushion is uniformly pushed along the width direction.

The gas generator 14 in the embodiment of FIGS. 1-3 is arranged along the upper surface of the seat pan 8. However, in other embodiments, the gas generator 14 may be arranged along the lower surface of the seat pan 8, such as in occupant protection system 10' of FIGS. 4(a), 4(b), and 5 described below. When the gas generator 14 is arranged along the lower surface of the seat pan 8, the arrangement of the gas generator 14 relative to the seat pan 8 is highly flexible. It will be understood that, in other embodiments, the arrangement of the gas generator relative to the seat pan is not limited to the upper surface and the lower surface of the seat pan.

Figure 4A:
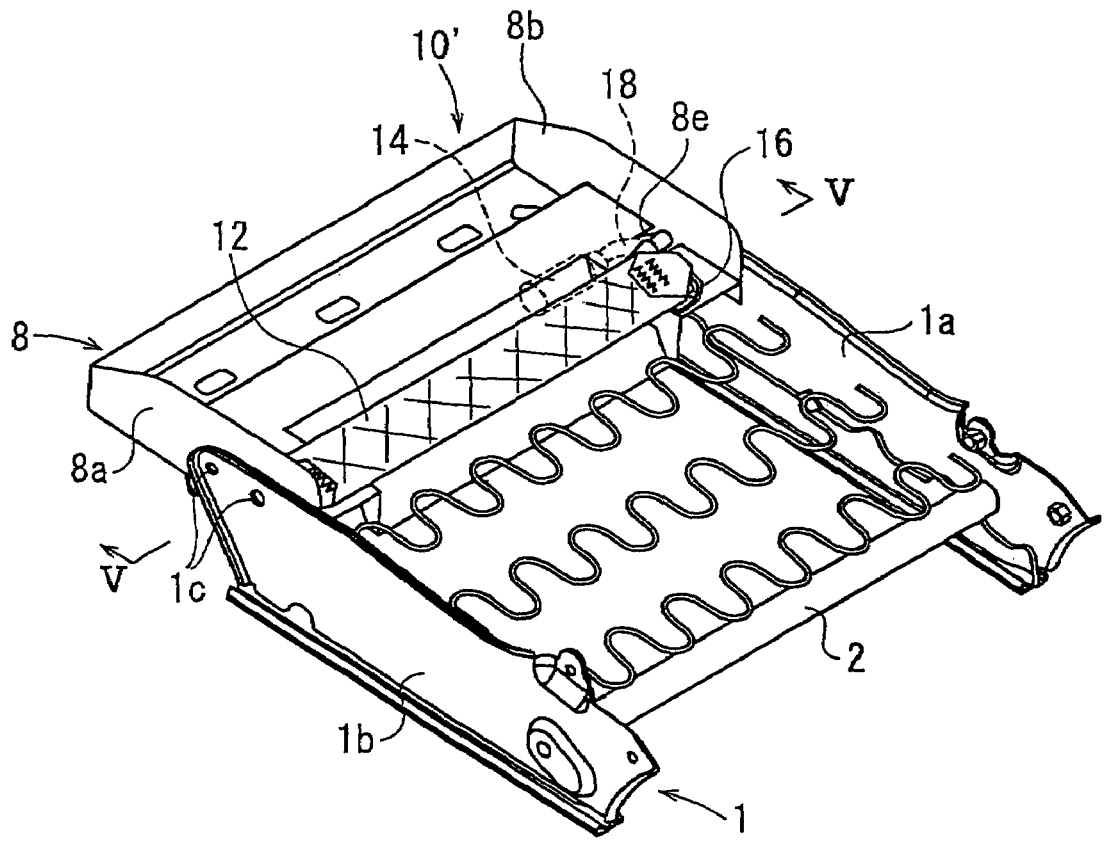
FIGS. 4(a) and 4(b) are perspective views of the frame of a seat provided with an occupant protection system according to another embodiment of the present invention.
Figure 4B:
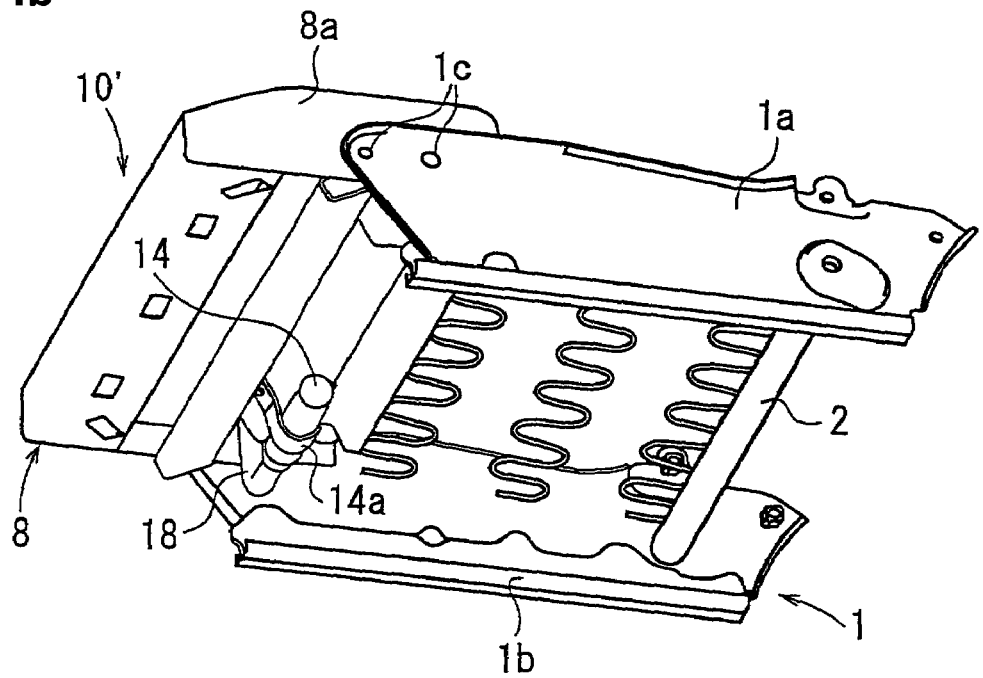

FIG. 4(a) is a top perspective view of a seat provided with occupant protection system 10'; FIG. 4(b) is a bottom perspective view of the seat; and FIG. 5 is a sectional view of the occupant protection system of FIG. 4(a), taken along line V-V.

Figure 5:
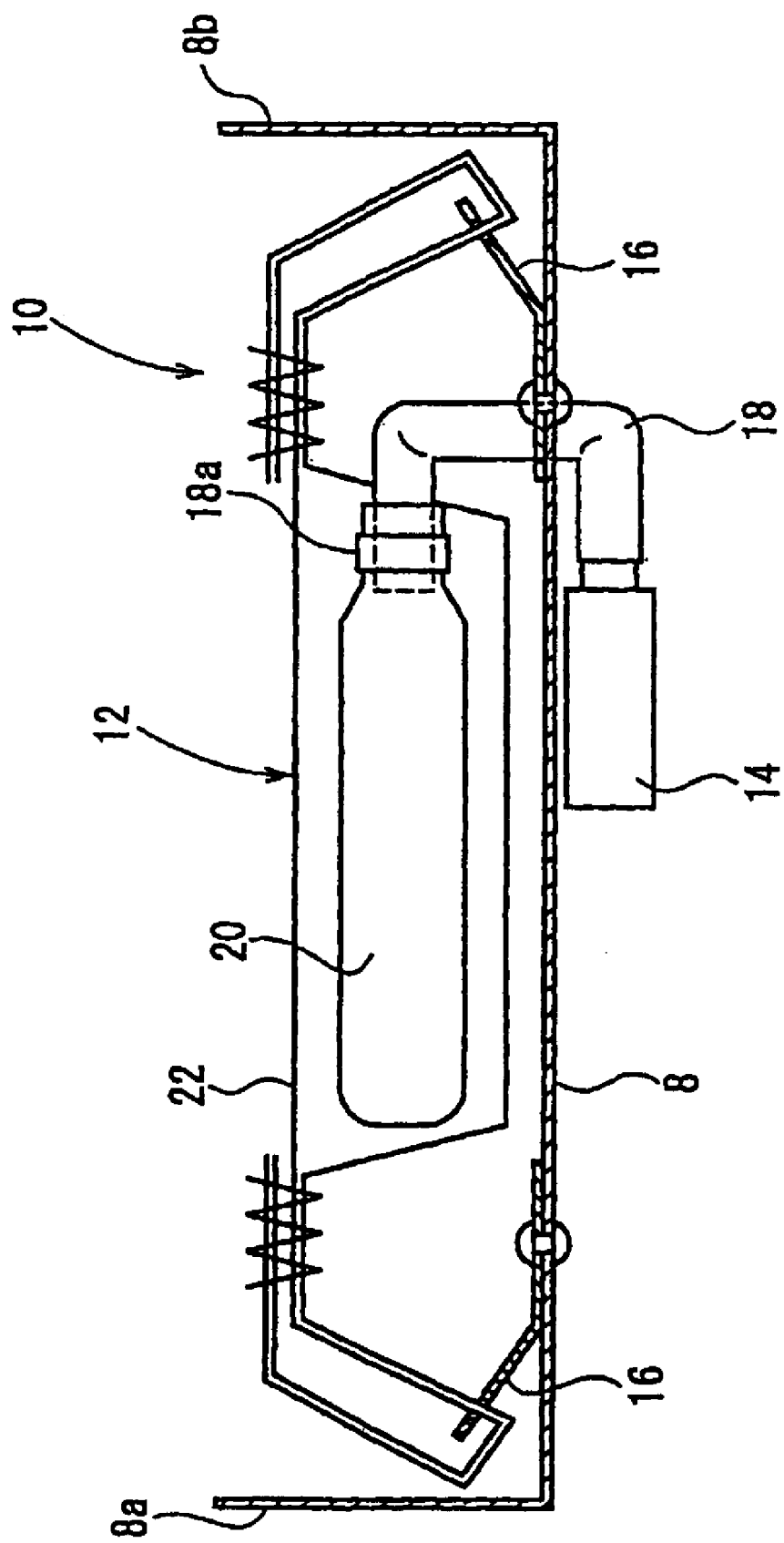
FIG. 5 is a sectional view of the occupant protection system in FIGS. 4(a) and 4(b), taken along line V-V.

In the occupant protection system 10' of FIGS. 4(a), 4(b), and 5, the gas generator 14 is arranged along the lower surface of the seat pan 8, with its longitudinal axis extending along the width direction of the seat pan 8. The airbag 12 is arranged above the upper surface of the seat pan 8. The seat pan 8 has an opening 8e for inserting a pipe 18, as seen in FIG. 4(a). The pipe 18 extends through the opening 8e from the lower surface of the seat pan 8 to the upper surface. The gas generator 14 is connected to the airbag 12 via the pipe 18.

Other features of the occupant protection system 10' are the same as those of the occupant protection system 10 in FIGS. 1 to 3, and the same reference numerals are given to components with the same functions.

As described above, the invention provides an occupant protection system that can be mounted to a seat remarkably easily.

The priority application, Japanese Patent Application No. 2002-338202 filed on Nov. 21, 2002, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant protection system, comprising:
   a seat pan arranged below a seat cushion;
   an inflatable airbag arranged above the seat pan for pushing the seat cushion from below; and
   a gas generator for inflating the airbag in an emergency, wherein the gas generator is separate and exterior to the airbag, and is connected to the airbag via a pipe;
   wherein the airbag and the gas generator are mounted to the seat pan;
   wherein the gas generator is arranged along the lower surface of the seat pan.

2. An occupant protection system according to claim 1, wherein the airbag extends along the width direction of the seat pan, opposite ends of the airbag being connected to the seat pan.

3. An occupant protection system, comprising:
   a seat pan configured to be mounted to a seat frame below a seat cushion;
   an inflatable airbag mounted to the seat pan to inflate above an upper surface of the seat pan to push the seat cushion from below; and
   a gas generator mounted to the seat pan and connected to the airbag to inflate the airbag, wherein the gas generator is separate from the airbag and the gas generator is connected to the airbag via a pipe;
   wherein the gas generator is arranged along the lower surface of the seat pan.

4. An occupant protection system according to claim 3, wherein the seat pan includes an opening, and the gas generator is connected to the airbag via the pipe, wherein the pipe extends from the gas generator, through the opening, to the airbag.

5. An occupant protection system according to claim 3, wherein the airbag extends along the width direction of the seat pan, opposite ends of the airbag being connected to the seat pan.

* * * * *